US010534847B2

(12) United States Patent
Krishna (10) Patent No.: US 10,534,847 B2
(45) Date of Patent: Jan. 14, 2020

(54) AUTOMATICALLY GENERATING DOCUMENTS

(71) Applicant: Microsoft Technology Licensing, LLC, Redmond, WA (US)

(72) Inventor: Om Krishna, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/470,193

(22) Filed: Mar. 27, 2017

(65) Prior Publication Data

US 2018/0276184 A1  Sep. 27, 2018

(51) Int. Cl.
*G06F 17/21* (2006.01)
*G06F 17/28* (2006.01)
(Continued)

(52) U.S. Cl.
CPC .......... *G06F 17/218* (2013.01); *G06F 3/0482* (2013.01); *G06F 17/2247* (2013.01); *G06F 17/248* (2013.01); *G06F 17/28* (2013.01)

(58) Field of Classification Search
CPC ... G06F 17/218; G06F 3/0482; G06F 17/2247
(Continued)

(56) References Cited

U.S. PATENT DOCUMENTS 7,203,646 B2 * 4/2007 Bennett .............. G06F 17/2775
704/257
7,318,193 B2  1/2008 Kim et al.
(Continued)

FOREIGN PATENT DOCUMENTS

WO  2011130870 A1  10/2011
WO  2015051450 A1   4/2015
WO  2016049631 A1   3/2016

OTHER PUBLICATIONS

"Automated Document Creation", https://weliarchive_org/web/20090928200111/http:/www.activedocs.com/solutions/creating_documents/automated_document_creation.html, Published on: Sep. 28, 2009, 4 pages.

(Continued)

*Primary Examiner* — Stephen S Hong
*Assistant Examiner* — Broderick C Anderson
(74) *Attorney, Agent, or Firm* — Michael Best & Friedrich LLP (57) ABSTRACT

Devices, systems, and methods for automatically creating a document. In one example, the system and method perform or include capturing, with a web-extension associated with a word-processing application, implicitly-tagged-content and an explicitly-tagged-content displayed on a web browser along with tags associated with the implicitly-tagged-content and the explicitly-tagged-content; receiving, with a speech-to-text interface, natural-language audio instruction associated with generating a document; generating, with a natural-language processor, a plain-text command associated with the natural-language audio instruction; retrieving personalized-content based on the plain-text command; and organizing, with a content-organizer, the personalized-content based on one or more criteria selected from a group consisting of page rank of a content displayed on the web browser, a source of the content, an authoring-style, and a document template. The document is generated using information received from the content-organizer.

20 Claims, 5 Drawing Sheets

(51) Int. Cl.
  *G06F 17/22* (2006.01)
  *G06F 17/24* (2006.01)
  *G06F 3/0482* (2013.01)

(58) Field of Classification Search
  USPC .......................................................... 715/202
  See application file for complete search history.

(56) References Cited

U.S. PATENT DOCUMENTS

| | | | |
|---|---|---|---|
| 7,337,388 | B2 | 2/2008 | Barnett et al. |
| 7,444,319 | B1 | 10/2008 | Sathyanarayan |
| 8,032,827 | B2 | 10/2011 | Melander et al. |
| 8,276,061 | B2 | 9/2012 | Joshi et al. |
| 8,452,769 | B2 | 5/2013 | Altaf et al. |
| 9,015,153 | B1 | 4/2015 | Zhang |
| 9,361,375 | B2 | 6/2016 | Chi et al. |
| 9,483,452 | B2 | 11/2016 | Blanchard et al. |
| 9,489,463 | B2 | 11/2016 | Walther et al. |
| 2005/0240583 | A1* | 10/2005 | Li .................. G06F 17/2235 |
| 2006/0048053 | A1* | 3/2006 | Sembower ......... G06F 16/9535 715/253 |
| 2009/0006442 | A1* | 1/2009 | Anderson ............. G06Q 10/10 |
| 2009/0222738 | A1* | 9/2009 | Drieschner ............ G06F 16/00 715/739 |
| 2012/0166373 | A1* | 6/2012 | Sweeney ............... G06N 5/02 706/14 |
| 2014/0136188 | A1* | 5/2014 | Wroczynski ........ G06F 17/2872 704/9 |
| 2015/0199345 | A1 | 7/2015 | Joshi et al. |
| 2015/0261773 | A1 | 9/2015 | Valid et al. |
| 2016/0313868 | A1 | 10/2016 | Weng et al. |

OTHER PUBLICATIONS

Bagalkotkar, et al., "A Novel Technique for Efficient Text Document Summarization as a Service", In Proceedings of Third International Conference on Advances in Computing and Communications, Aug. 29, 2013, pp. 50-51.

"Customize and Personalize Chrome on your desktop computer with Extensions, Themes and Apps", https://chrome.google.com/webstore/unsupported/ndjpnladcallmjemlbaebfadecfhkepb, Retrieved on: Feb. 23, 2017, 2 pages.

"Language Understanding Intelligent Service", https://www.microsoft.com/cognitive-services/en-us/language-understanding-intelligent-service-luis, Retrieved on: Feb. 23, 2017, 7 pages.

Ahmed, Waqas, "Too Long, Didn't Read Extension for Chrome Summarizes Long Articles", Retrieved From <<https://www.addictivetips.com/web/too-long-didnt-read-extension-for-chrome-summarizes-long-articles/>>, May 28, 2014, 10 Pages.

"International Search Report & Written Opinion Issued in PCT Application No. PCT/US2018/023204", dated Jun. 28, 2018, 13 Pages.

* cited by examiner

AUTOMATICALLY GENERATING DOCUMENTS

FIELD

Embodiments described herein relate to systems and methods for automatically generating documents.

BACKGROUND

Authoring a new document or paper involves repetitive steps like researching, creating notes, writing the document, applying templates, formatting the document, and creating a bibliography. An author often performs document research by searching the internet using a web browser and search engine for content related to a topic of interest. Search engines use algorithms to retrieve relevant content associated with the topic of interest. Typically, the retrieved search results are presented on a display screen for the user to process and consume. The user now has to triage the large amount of information by reading, parsing, and organizing the information in the document. The repetitive steps performed by the user to create a document are time-consuming because of the various manual interventions that are necessary.

SUMMARY

Systems and methods are provided herein that, among other things, allow a user to automatically create a document using a word-processing application. The automatic creation of the document depends on at least four components, namely, (1) Intent and Topic of the document captured by a personal digital assistant integrated into the Word processing application (2)) Content on the internet that the user has browsed in the past (3) Related content that other people in user's organization have produced (4) User's authoring-style i.e. fonts, templates etc. that he generally likes to use. In some embodiments, the automatically created document is similar to an early draft version that the user has manually created in similar situations. The system is also capable of improving the quality of the finished document based on learning from various actions taken by the user during a normal document creation process. Overall this speeds up the process of new document creation by providing an automatically created draft version of the document rather than an empty document to start with. In another example, a user may interact with a computing device that includes a personal digital assistant by providing natural-language audio instructions asking the personal digital assistant to automatically create a document related to a particular topic. In one example, a user who is part of a team working on a particular topic may request a personal digital assistant to automatically create a document on the particular topic.

As an example, assume that a user is interested in creating a document on "melting glaciers." Embodiments provided herein, allows a word-processing application to automatically access the user's web browsing history associated with "melting glaciers," any previously saved content by the user, and any other information available within an information technology or computer system that the user may be associated with (for example, research documents, experimental results, and other information stored in a local database). In one embodiment, the word-processing application includes a natural-language interface to allow a user to interface with the word-processing application by providing natural-language commands such as "create a document on melting glaciers." The word-processing application may be configured to ask the user follow up questions such as, "what title would you prefer" or "would you like to use your default template?". The systems and methods provided herein automate various steps that that may be carried out during the preparation of a document to save a user time and decrease the amount of time needed to create a document. Automated steps include, in one example, storing tagged (either explicitly-tagged or implicitly-tagged) content in a database and using a content-organizer to arrange all the relevant materials associated with "melting glaciers" that is available to the word-processing application.

One embodiment provides a computing device for automatically creating documents. In some embodiments, the computing device comprises a display device to display a web browser. The computing device also includes an electronic processor configured to capture, with a web-extension, an implicitly-tagged-content and an explicitly-tagged-content displayed on the web browser along with tags associated with the implicitly-tagged-content and the explicitly-tagged-content. The web-extension is associated with a word-processing application. The electronic processor is also configured to receive, with a speech-to-text interface, natural-language audio instruction associated with generating a document; generate, with a natural-language processor, a plain-text command associated with the natural-language audio instruction; retrieve personalized-content based on the plain-text command; and organize, with a content-organizer, the personalized-content based on one or more criteria selected from a group consisting of page rank of a content displayed on the web browser, a source of the content, an authoring-style, and a document template. The electronic processor is also configured to generate the document using information received from the content-organizer, and display the document with the display device.

Another embodiment provides a method of automatically creating documents. In one example, the method comprises capturing, with a web-extension associated with a word-processing application, implicitly-tagged-content and explicitly-tagged-content displayed on a web browser along with tags associated with the implicitly-tagged-content and the explicitly-tagged-content. The method also includes receiving, with a speech-to-text interface, natural-language audio instruction associated with generating a document; generating, with a natural-language processor, a plain-text command associated with the natural-language audio instruction; and retrieving personalized-content based on the plain-text command. The method also includes organizing, with a content-organizer, the personalized-content based on one or more criteria selected from a group consisting of a page rank of content displayed on the web browser, a source of the content, an authoring-style, and a document template; and generating the document using information received from the content-organizer.

Another embodiment provides a system for automatically creating documents. The system comprises a computing device, which includes an electronic processor. The electronic processor is configured to capture, with a web-extension associated with a word-processing application, implicitly-tagged-content and explicitly-tagged-content displayed on a web browser along with tags associated with the implicitly-tagged-content and the explicitly-tagged-content. The electronic processor is also configured to receive, with a speech-to-text interface, natural-language audio instruction associated with generating a document; generate, with a natural-language processor, a plain-text command associated with the natural-language audio instruction; retrieve personalized-content based on the plain-text command; and organize, with a content-organizer, the personalized content based on one or more criteria selected from a group consisting of a page rank of content displayed on the web browser, a source of the content, an authoring-style, and a document template. The electronic processor is configured to and generate the document using information received from the content-organizer.

Other aspects of the various embodiments provided herein will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments provided herein. The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
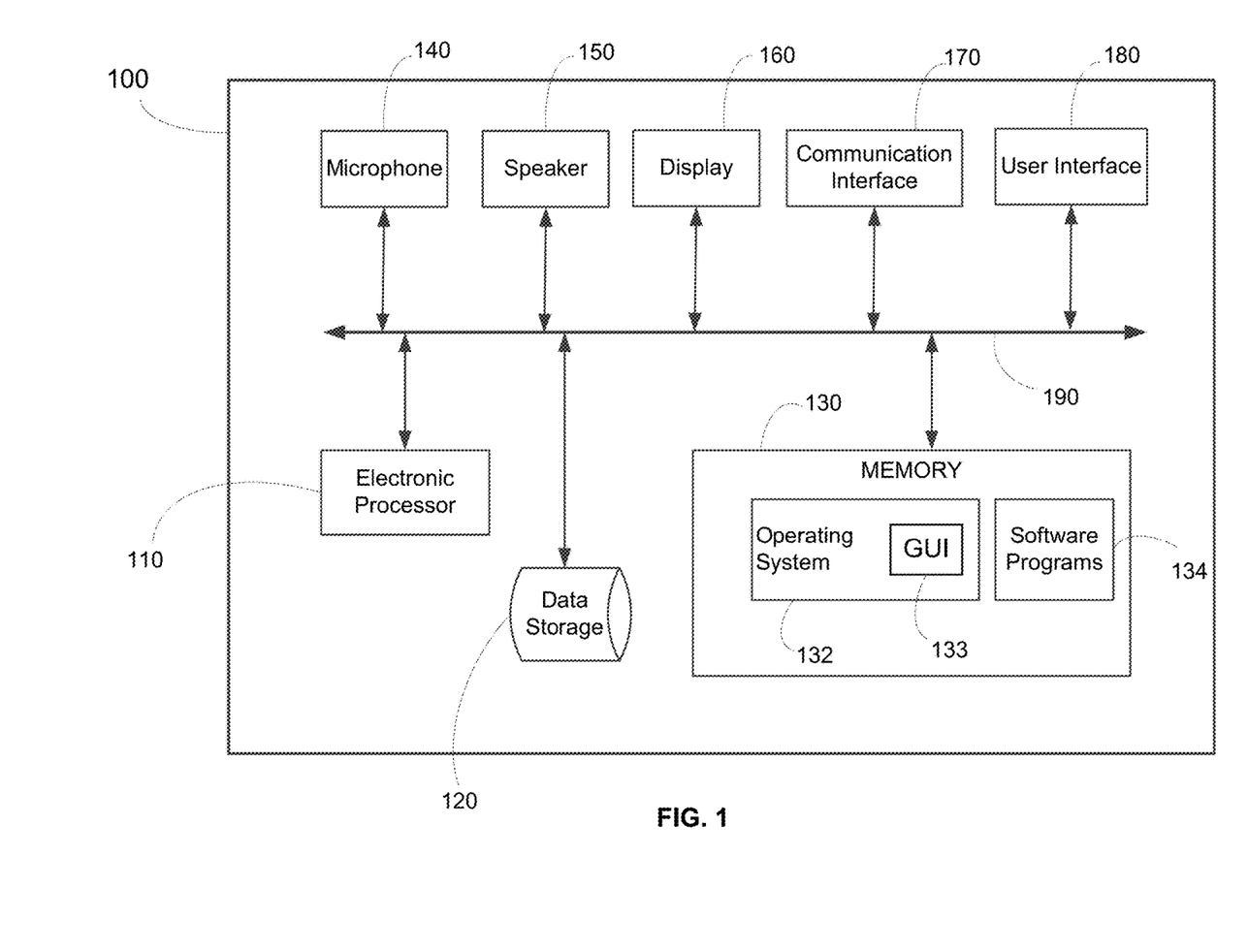
FIG. 1 illustrates a block diagram of the computing device in accordance with some embodiments.

FIG. 1 illustrates a block diagram of the computing device 100 in accordance with some embodiments. The computing device 100 may combine hardware, software, firmware, and system on-a-chip technology to implement the method of automatic creation of documents as provided herein. In some embodiments, the computing device 100 includes an electronic processor 110, a data storage device 120, a memory 130, a microphone 140, a speaker 150, a display 160, a communication interface 170, a user interface 180 (for example, electronic mouse, keyboard, trackball, stylus, touch-pad, touch screen, etc.) and a bus 190.

The memory 130 includes an operating system 132 and one or more software programs 134 that provide algorithms to retrieve various content and automatically generate a document associated with the vocalization. In some embodiments, the operating system 132 includes a graphical user interface (GUI) 133 that is a human-computer interface. The graphical user interface 133 uses icons, menus and other visual indicators or graphical representations to display information and related user controls. In some embodiments, the graphical user interface 133 may include the following items: windows, pull-down menus, buttons, scroll bars, icon-images, wizards, mouse cursor, etc. In one embodiment, the electronic processor 110 may include at least one microprocessor and be in communication with at least one microprocessor. The microprocessor interprets and executes a set of instructions stored in the memory 130. The one or more software programs 134 may be configured to implement the methods described herein. In some embodiments, the memory 130 includes volatile memory elements (for example, random access memory (RAM)), nonvolatile memory elements (for example, ROM), and combinations thereof. In some embodiments, the memory 130 has a distributed architecture, where various components are situated remotely from one another, but may be accessed by the electronic processor 110.

The data storage device 120 may include a non-transitory, tangible, machine-readable storage medium that stores machine-readable code or instructions. In one example, the data storage device 120 stores a set of instructions detailing a method provide herein that when executed by one or more processors cause the one or more processors to perform the method. The data storage device 120 may also be a database or a database interface for storing an application module. In one example, the data storage device 120 is located external to the computing device 100.

The communication interface 170 provides the computing device 100 a communication gateway with an external network (for example, a wireless network, the internet, etc.). The communication interface 170 may include, for example, an Ethernet card or adapter or a wireless local area network (WLAN) card or adapter (for example, IEEE standard 802.11a/b/g/n). The communication interface 170 may include address, control, and/or data connections to enable appropriate communications on the external network.

The user interface 180 provides a mechanism for a user to interact with the computing device 100. The user interface 180 includes input devices such as a keyboard, a mouse, a touch-pad device, and touch-screen display. In some embodiments, the user interface 180 may also include a software programs including speech-to-text and text-to-speech interfaces. In some embodiments, the user interface 180 includes a command language interface wherein the user may provide the computing device 100 with program-specific instructions. In some embodiments, the user interface 180 includes menus that a user may use to choose particular commands from lists displayed on the display 160.

The bus 190, or other component interconnection, may permit communication among the components of the computing device 100. The bus 190 may be, for example, one or more buses or other wired or wireless connections, as is known in the art. The bus 190 may have additional elements, which are omitted for simplicity, such as controllers, buffers (for example, caches), drivers, repeaters and receivers, or other similar components, to enable communications. The bus 190 may also include address, control, data connections, or a combination of the foregoing to enable appropriate communications among the aforementioned components.

Figure 2:
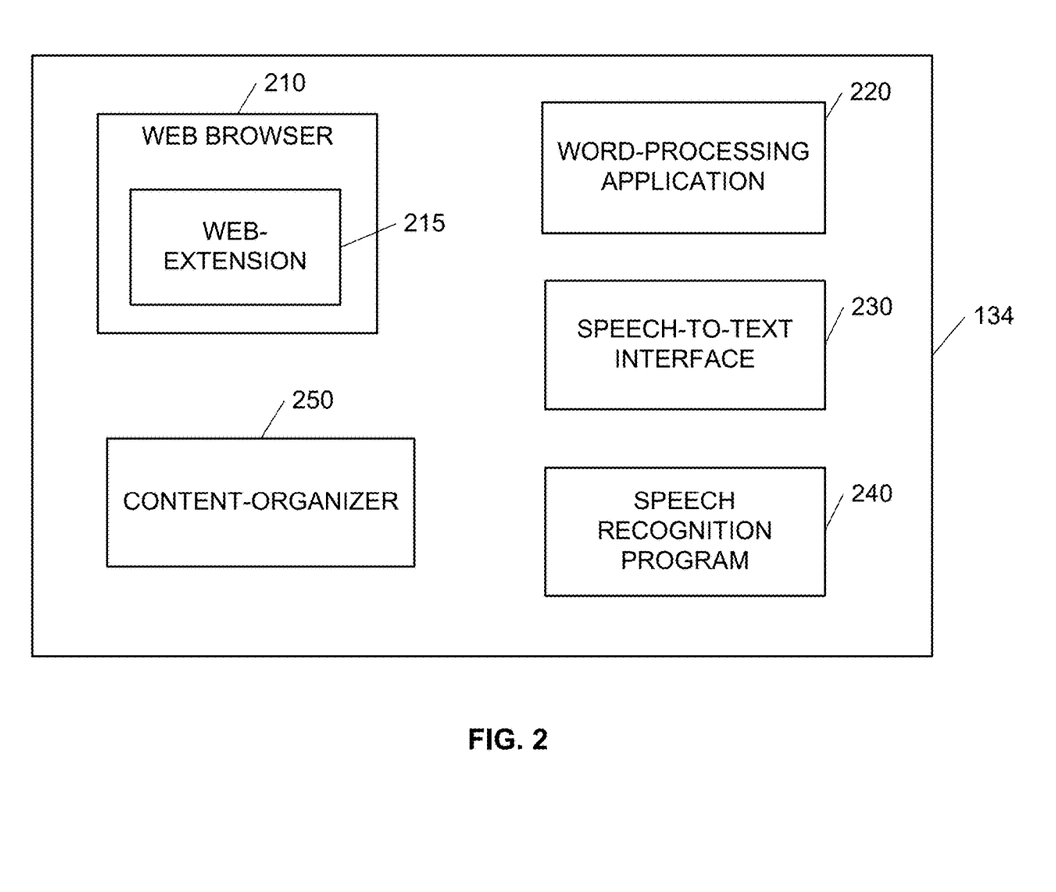
FIG. 2 illustrates various software programs stored in the memory shown in FIG. 1, in accordance with some embodiments.

FIG. 2 illustrates various software programs 134 stored in the memory 130 shown in FIG. 1, in accordance with some embodiments. In one example, the software programs 134 includes a web browser 210, a word-processing application 220, a speech-to-text interface 230, a speech recognition program 240, and a content-organizer 250. The web browser 210 includes a web-extension 215 that is associated with the word-processing application 220. In some embodiments, the web-extension 215 (for example, Chrome extension or Edge extension) includes one or more software programs that are used to add new features or modify an existing functionality of a software program 134 such as a word-processing application 220 (for example, Microsoft Office).

Figure 3:
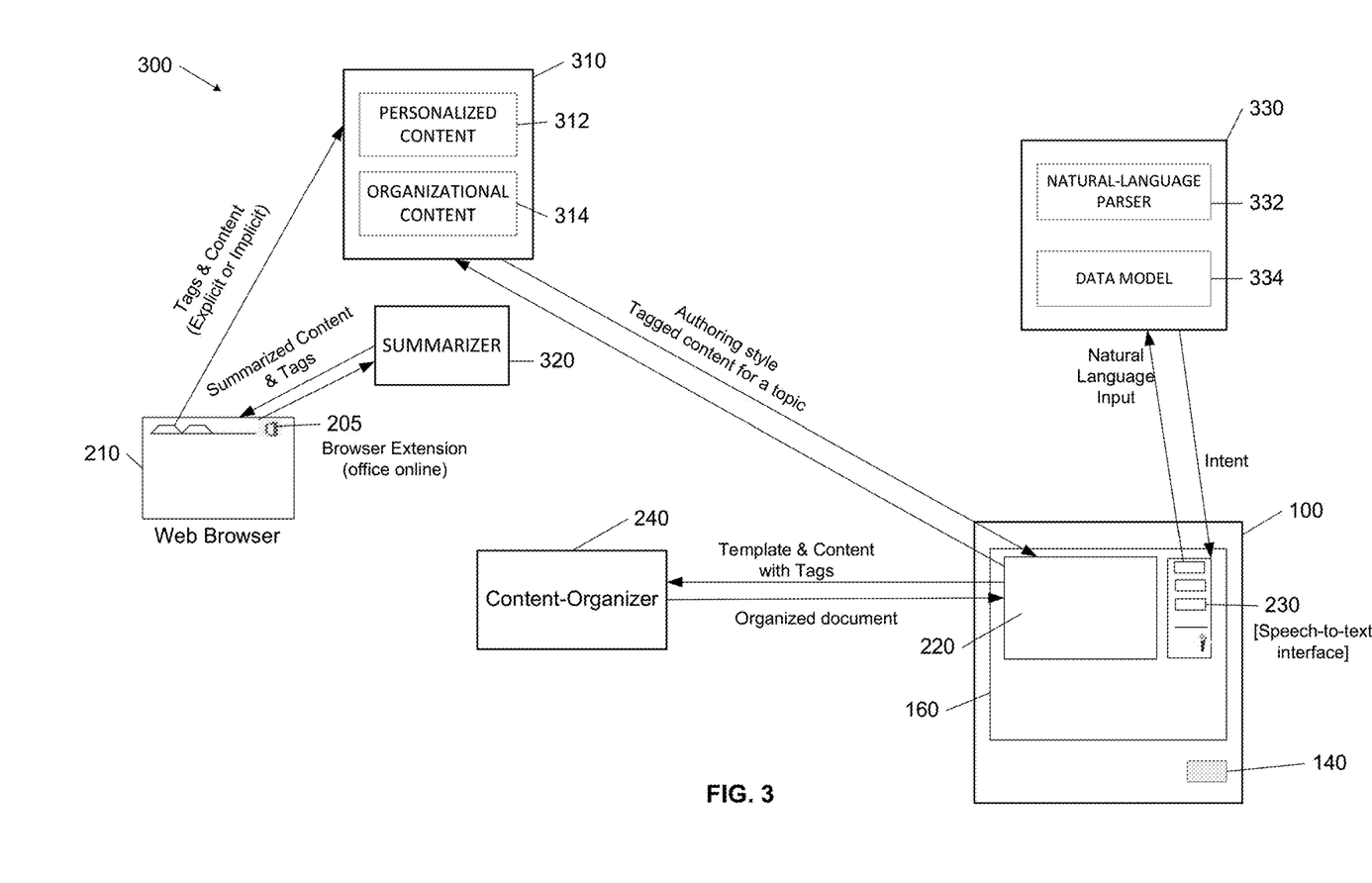
FIG. 3 illustrates a system for automatically creating documents, in accordance with some embodiments.

FIG. 3 illustrates a system 300 for automatically creating documents, in accordance with some embodiments. The system 300 includes a computing device 100, a personalization server 310, a summarizer 320 (for example, a TL;DR (too long; didn't read) server), a natural-language processor 330, the content-organizer 250 and the web browser 210.

In some embodiments, the computing device 100 includes a microphone 140 that is configured to receive audio instructions, from a user, related to automatic creation of a document. The received audio instructions at the microphone 140 is processed using the speech recognition program 240 to generate a natural-language input for the natural-language processor 330. The computing device 100 also includes a display 160 that is configured to display a web browser 210 including a web-extension 215, a word-processing application 220, and a speech-to-text interface 230. In one example, the web-extension 215 is automatically activated when the web browser 210 is being used. In another example, the web-extension 215 may be manually activated by the user. The web browser 210 is configured to connect to the internet using the communication interface 170.

In some embodiments, the web-extension 215 is configured to capture content reviewed by the user while browsing the internet. In one example, the web-extension 215 includes or interacts with a highlight tool that permits a user, during a web browsing session, to highlight text (for example, using an electronic mouse to select desired text) that is interesting to the user and tag the content before moving to the next web-page or web-site. Tagging content that is interesting to the user is referred to as "explicit-tagging." In one example, the highlighted text is tagged by performing a right click on the electronic mouse and choosing an option within a drop-down menu (for example, "Tag this") to tag the highlighted text. Similarly, various images that the user might be interested in may also be tagged for future use during an automatic creation of a document. In some embodiments, the explicitly-tagged-content is given a particular name or title, which allows the various explicitly-tagged-content to be saved in an orderly manner within the personalized-content database 312. In some embodiments, the computing device 100 is configured to retrieve a particular explicitly-tagged-content at a later date during an automatic document creation instance.

The computing device 100 may also automatically tag content, which is referred to as "implicit-tagging." Implicit-tagging may be performed on content that is not in a format that can be easily read by the user. In some embodiments, implicit-tagging is performed on content that is too long or voluminous. In some embodiments, implicit tagging is performed on content that is presented in a foreign language that is not comprehensible to the user. In some embodiments, the implicitly tagged content is sent to a summarizer 320 for further processing. In some embodiments, the computing device 100 is configured to automatically tag content displayed on the web browser 210 that cannot be read by the user due to a lack of time. Such automatically tagged content may be sent to the summarizer 320. In some embodiments, the summarizer 320 is configured to summarize implicitly-tagged-content and send summarized-content back to the web browser 210. In some embodiments, the summarizer 320 sends the summarized-content for storage in a personalized-content database 312 within the personalization server 310. In some embodiments, summarizer 320 may be configured to create different kinds of summaries. In one example, a theme-oriented summary is created, which includes sentences, which are most relevant to a given topic (for example, politics, economics, sports, etc.). In another example, a structure-oriented summary is presented that depends on an input document structure (for example, scientific article, news article, etc.). In another example, a concept-oriented summary is created based on a number of user-defined concepts.

In some embodiments, the personalization server 310 includes a personalized-content database 312 and an organizational-content database 314 that stores personalized content and organizational content, respectively. In one example, the personalized content includes content that is explicitly-tagged by a user while browsing through search results or other materials displayed by the computing device 100. In another example, the personalized-content includes content that is implicitly-tagged using a service to summarize content that may be too long for the user to read or be able to be displayed on the web browser 210. In one example, the organizational-content includes emails, social conversations, meeting notes, documents available using one or more cloud applications (for example, Office Graph, Delve, Dropbox, Google Drive, Sharepoint, OneDrive, etc.).

The natural-language processor 330 may be implemented using a language understanding intelligent service (LUIS) or similar service that provides a cloud-based service for conversational understanding for software applications and devices. The natural-language processor 330 may include a natural-language parser 332 and a data model 334. The natural-language parser 332 is configured to receive natural-language phrases from a speech-to-text interface 230, which receives audio signals from the microphone 140. The natural-language processor 330 is configured to convert the natural-language phrases into intelligent commands and/or text that may be used by the computing device 100. In one example, the speech-to-text interface 230 is an interactive interface wherein the computing device 100 is capable of asking questions to the user to identify the task the user is trying to accomplish. In some embodiments, the user may either type in various commands within a command-line interface associated with the speech-to-text interface 230 or provide audible commands that is used to perform several functions during the automatic document creation process provided herein.

Figure 4:
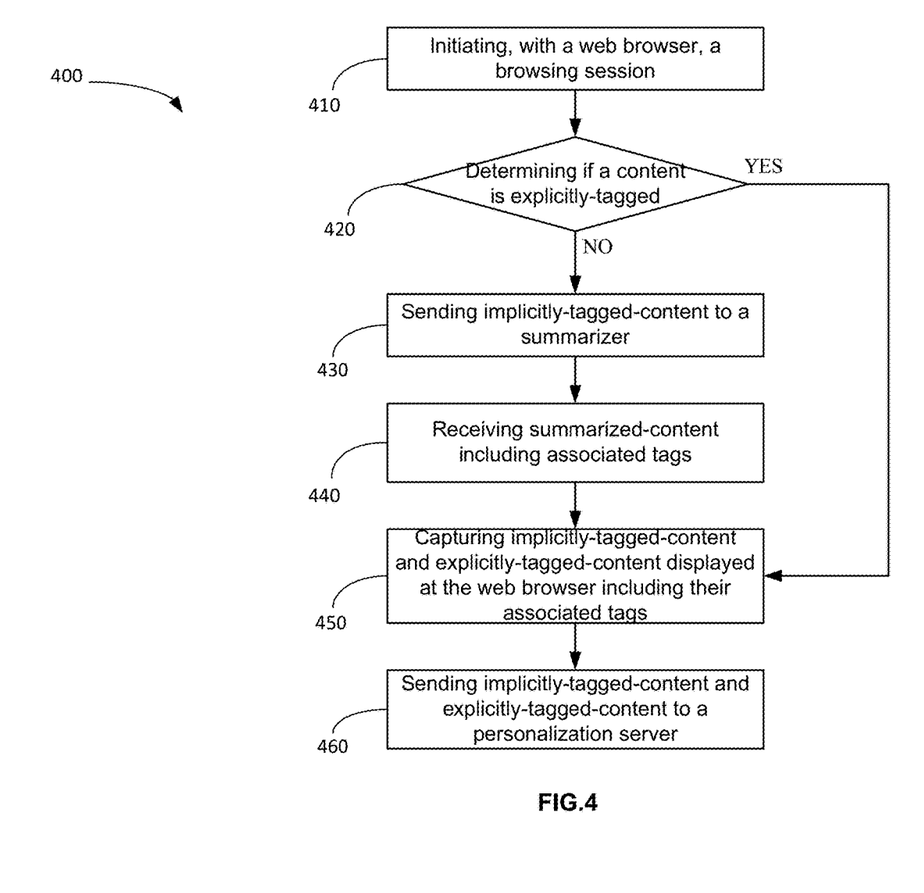
FIG. 4 is a flow chart of a method of capturing web content, in accordance with some embodiments.

FIG. 4 is a flow chart of a method 400 for capturing web content, in accordance with some embodiments. The method 400 includes initiating a browsing session using the web browser 210 (at block 410). For example, when a user decides to perform research on the internet on a particular topic, the user opens a web browser to perform the research. As the user continues to perform web browsing, the web-extension 215 associated with a word-processing application 220 keeps running in the background while at the same time keeping track of the various choices the user makes during the web browsing session. When the user visits particular websites during his/her research, an implicit set of tags along with associated content may be sent to the personalization server 310. In some embodiments, when various pages get rendered, the content associated with the rendered pages will be sent to a summarization service (for example, TL;DR (too, long; didn't read)) provided at the summarizer 320. In some embodiments, the summarizer 104 provides summarized-content of the pages visited by the user. Once the summarized-content is received the computing device 100 automatically creates tags associated with the content and sends the content to the personalization server 310. In one embodiment, as a user is searching and browsing the web on particular topic, automatic tags along with its associated content will be sent to the personalization server 310 for storage so that it can be used in the future by the user during an auto-creation scenario as explained below.

The method 400 also includes determining whether content is explicitly-tagged (at block 420). When the content is explicitly-tagged, the method 400 proceeds to block 450. On the other hand, when the content is implicitly-tagged, the method 400 proceeds to block 430. The method 400 includes sending implicitly-tagged content to the summarizer 320 (at block 430). The method 400 further includes receiving summarized content including associated tags (at block 440). The method 400 also includes capturing implicitly-tagged and explicitly-tagged content displayed at the web browser including their associated tags (at the block 450). In addition, the method 400 includes sending implicitly-tagged and explicitly-tagged content to the personalization server 310 (at block 460).

Figure 5:
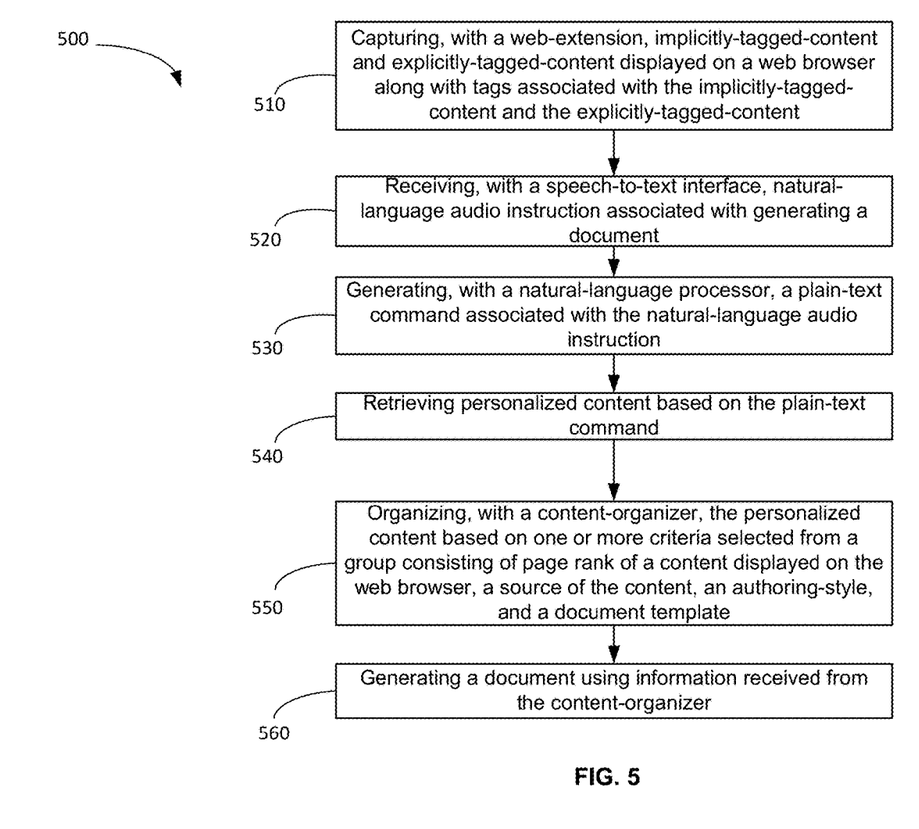
FIG. 5 is a flow chart of a method for automatically creating documents, in accordance with some embodiments.

FIG. 5 is a flow chart of a method 500 for automatically generating documents, in accordance with some embodiments. In some embodiments, the method 500 includes capturing, with a web-extension 215, implicitly-tagged-content and explicitly-tagged-content displayed on a web browser 210 along with tags (for example, the origin of the particular content and/or web link to the content) associated with the implicitly-tagged-content and the explicitly-tagged-content (at block 510). In some embodiments, the explicitly-tagged-content is captured based on a user selection of the content displayed on the web browser 210. In some embodiments, the implicitly-tagged-content is sent to a summarizer, which generates summarized-content associated with the implicitly-tagged-content. In some embodiments, the method 500 includes sending the implicitly-tagged-content and the explicitly-tagged-content and their associated tags and/or references to the personalization server 310.

In some embodiment, the method 500 includes receiving, with a speech-to-text interface 230, a natural-language audio instruction associated with generating a document (at block 520). The speech-to-text interface 230 converts the natural-language audio instruction into a textual equivalent of the natural-language audio instruction. Additionally, the speech-to-text interface 230 sends the textual equivalent of the natural-language instruction to a natural-language processor 330. In one example, the speech-to-text interface 230 is configured to be conversational with the user, wherein the speech-to-text interface 230 uses a text-to-speech interface to prompt the user for required inputs to generate the document requested by the user. In one example, the computing device 100 may ask the user for the desired title for the document that is being created. In another example, the computing device 100 may ask the user as to the type of document template that should be used for the document that is being created.

In some embodiments, the method 500 further includes generating, with a natural-language processor 330, a plain-text command associated with the natural-language audio instruction (at block 530). The natural-language parser 332 is configured to parse the textual equivalent of the natural-language audio instruction and send the results to the data model 334, which is configured to determine particular plain-text commands associated with the natural-language audio instruction.

In some embodiments, the method 500 includes retrieving content based on the plain-text command from the natural-language processor 330 (at block 540). In one example, the computing device 100 retrieves personalized-content stored in personalized-content database 312 and organizational-content stored in the organizational-content database 314 based on the input commands received from the user at the speech-to-text interface 230.

In some embodiments, the method 500 includes organizing, with a content-organizer 250, the personalized-content based on one or more criteria (at block 550). In one example, the content-organizer 250 arranges the personalized-content based on the particular page rank associated with individual items within the personalized-content. In one example, the content-organizer 250 arranges the personalized-content based on the source of each particular item within the personalized-content. In some embodiments, the content-organizer 250 is configured to arrange the personalized-content and the organizational-content retrieved as a result of the plain-text command. In one example, the content-organizer 250 is configured to receive a document template from the word-processing application 105 in order to arrange the personalized-content and the organizational-content within the document that is being created. The personalized-content and the organizational-content may be arranged in a particular order (for example, Title, Introduction, Architecture, Research, Experiments, Conclusion, and References, etc.). In some embodiments, the method 500 includes sending, with the content-organizer 250, an organized document including the implicitly-tagged-content and the explicitly-tagged-content to the word-processing application 220.

In some embodiments, the method 500 includes generating a document using information received from the content-organizer 250 (at block 560). In one example, the word-processing application 220 may query the user for any subsequent changes or additions that are desired with respect to the automatically created document. The user may provide further details to the word-processing application either using a natural-language audio command or by typing specific instructions at an interface associated with the word-processing application 220.

In some embodiments, a server may execute the software described herein, and a user may access and interact with the software application using a computing device. Also, in some embodiments, functionality provided by the software application as described above may be distributed between a software application executed by a user's portable communication device and a software application executed by another electronic process or device (for example, a server) external to the computing device. For example, a user can execute a software application (for example, a mobile application) installed on his or her smart device, which may be configured to communicate with another software application installed on a server.

Various features and advantages of some embodiments are set forth in the following claims.

What is claimed is:

1. A computing device for automatically creating documents, the computing device comprising:
a display device to display content within a web page on a web browser; and
an electronic processor configured to
capture, with a web-extension associated with a word-processing application, content that is associated with a tag and that includes implicitly-tagged-content selected automatically from the displayed content and explicitly-tagged-content selected by a user from the displayed content;
retrieve tags associated with each of the implicitly-tagged-content and the explicitly-tagged-content;
receive, command associated with generating a document;
retrieve personalized content using the retrieved tags based on the command;
organize, with a content-organizer, the personalized content based on one or more criteria selected from the group consisting of page rank of the implicitly-tagged content and the explicitly-tagged-content displayed on the web browser, a source of the implicitly-tagged-content and the explicitly-tagged-content, an authoring-style, and a document template;
generate the document using information received from the content-organizer, and
display the document with the display device.

2. The computing device of claim 1, wherein the implicitly-tagged-content is sent to a summarizer, wherein the summarizer generates summarized-content associated with the implicitly-tagged-content.

3. The computing device of claim 1, wherein the electronic processor is further configured to
send the implicitly-tagged-content and the explicitly-tagged-content and tags associated with each of the implicitly-tagged-content and the explicitly-tagged-content to a personalization server.

4. The computing device of claim 3, wherein the personalization server includes a personalized content database to store the personalized content and an organizational-content database to store organizational-content.

5. The computing device of claim 1, wherein the content-organizer receives a document template from the word-processing application.

6. The computing device as claimed in claim 1, wherein the electronic processor is further configured to
receive, with a speech-to-text interface, a natural-language audio instruction associated with generating a document, and
generate, with a natural-language processor, a plain-text command associated with the natural-language audio instruction to create the command.

7. A method of automatically creating documents, the method comprising:
capturing, content that is associated with a tag and that includes implicitly-tagged-content selected automatically from content displayed within a web page on a web browser and an explicitly-tagged-content selected by a user from the displayed content along with tags associated with the implicitly-tagged-content and the explicitly-tagged-content,
retrieving tags associated with each of the implicitly-tagged-content and the explicitly-tagged-content,
receiving, a command associated with generating a document,
retrieving personalized content using the retrieved tags based on the command,
organizing, with a content-organizer, the personalized content based on one or more criteria selected from the group consisting of page rank of the implicitly-tagged-content and the explicitly-tagged-content displayed on the web browser, a source of the implicitly-tagged-content and the explicitly-tagged-content, an authoring-style, and a document template,
generating the document using information received from the content-organizer, and
displaying the document using a display device.

8. The method of claim 7, further comprising:
sending the implicitly-tagged-content to a summarizer.

9. The method of claim 7, further comprising:
generating summarized-content associated with the implicitly-tagged-content.

10. The method of claim 7, further comprising:
sending the implicitly-tagged-content and the explicitly-tagged-content and tags associated with each of the implicitly-tagged-content and the explicitly-tagged-content to a personalization server.

11. The method of claim 7, further comprising:
receiving, with the content-organizer, a document template from the word-processing application.

12. The method of claim 11, further comprising:
sending, with the content-organizer, an organized document including the implicitly-tagged-content and the explicitly-tagged-content to the word-processing application.

13. The method of claim 7, further comprising
receiving, with a speech-to-text interface, a natural-language audio instruction associated with generating a document, and
generating, with a natural-language processor, a plain-text command associated with the natural-language audio instruction to create the command.

14. A system for automatically creating documents, the system comprising:
a computing device including
a display device to display content within a web page on a web browser; and
an electronic processor configured to
capture, via a word-processing application, content that is associated with a tag and that includes implicitly-tagged-content selected automatically from the displayed content and an explicitly-tagged-content selected by a user from the displayed content;
retrieve tags associated with each of the implicitly-tagged-content and the explicitly-tagged-content;
receive, via an interface, a command associated with generating a document;
retrieve personalized content using the retrieved tags based on the command;
organize, with a content-organizer, the personalized content based on one or more criteria selected from the group consisting of page rank of the implicitly-tagged content and the explicitly-tagged-content displayed on the web browser, a source of the implicitly-tagged-content and the explicitly-tagged-content, an authoring-style, and a document template;
generate the document using information received from the content-organizer, and
display the document using the display device.

15. The system of claim 14, wherein the implicitly-tagged-content is sent to a summarizer.

16. The system of claim 15, wherein the summarizer generates summarized-content associated with the implicitly-tagged-content.

17. The system of claim 14, wherein the computing device is further configured to send the implicitly-tagged-content and the explicitly-tagged-content and tags associated with each of the implicitly-tagged-content and the explicitly-tagged-content to a personalization server.

18. The system of claim 17, wherein the personalization server includes a personalized content database to store the personalized content and an organizational-content database to store organizational-content.

19. The system of claim 14, wherein the content-organizer receives a document template from the word-processing application.

20. The system of claim 14, wherein the electronic processor is further configured to
receive, with a speech-to-text interface, a natural-language audio instruction associated with generating a document; and
generate, with a natural-language processor, a plain-text command associated with the natural-language audio instruction to create the command.

\* \* \* \* \*